United States Patent

Ogura

[15] 3,656,704

[45] Apr. 18, 1972

[54] CASSETTE TYPE TAPE RECORDER

[72] Inventor: Daihati Ogura, Kyoto, Japan

[73] Assignee: Mitsubishi Electric Corporation, Chiyoda-ku, Tokyo, Japan

[22] Filed: Nov. 25, 1970

[21] Appl. No.: 92,721

[30] Foreign Application Priority Data

Nov. 27, 1969 Japan....................................44/112766

[52] U.S. Cl.....................................................242/198, 274/4 F

[51] Int. Cl...................G03b 1/04, G11b 15/32, G11b 23/04

[58] Field of Search..........................................242/197–200; 274/4 F, 4 G

[56] References Cited

UNITED STATES PATENTS

| | | | |
|---|---|---|---|
| 3,395,871 | 8/1968 | Ackermann et al. | 242/198 |
| 3,475,031 | 10/1969 | Kuehnlein | 274/4 F |
| 3,494,572 | 2/1970 | Uemura | 242/198 |

*Primary Examiner*—Leonard D. Christian
*Attorney*—Oblon, Fisher & Spivak

[57] ABSTRACT

Disclosed herein is a cassette type tape recorder which readily permits insertion and removal of the cassette by a simple operation and further provides high stability against vibration. The tape recorder is operated simply by inserting a horizontally disposed cassette through an inlet provided on an operating panel and pushing down a handle, and the cassette is easily removed by just pushing a releasing button.

The recorder is provided with a magnetic head and a pinch roller on a subordinate base member which is slidably disposed on a main base member. A bridge member having a holder in which the cassette is horizontally inserted is pivotally joined to the main base member through an arrangement of joint shafts and connecting rods for vertically moving the same within the recorder. A cam surface on the bridge member is engaged with a set roller provided on the subordinate base member so that the bridge member is retained in the lower position and the recorder in an operating condition when the bridge member reaches the end of its downward stroke. On the other hand, the cam of the bridge member is disengaged from the set roller of the subordinate base, allowing the bridge member to automatically move upward under the urging of a spring, and consequently to stop the operation of the recorder, whenever a release button fixed on one end of the subordinate base member is pushed.

6 Claims, 5 Drawing Figures

INVENTOR

DAIHATI OGURA

BY Oblon, Fisher & Spivak

ATTORNEYS

CASSETTE TYPE TAPE RECORDER

BACKGROUND OF THE INVENTION

1. Field of the Invention

This invention generally relates to cassette type recorders, and more particularly it relates to a cassette tape recorder having a structure particularly suitable for use as a stereo component or system in a car.

2. Description of the Prior Art

It is well known that the use of cassette for tape recorders has recently served to extremely simplify the handling of tapes and the operation of tape recording instruments. For the purpose of inserting these cassettes into a tape driving device, they must be provided with hub holes for the reel shaft and the reel, a hole for the capstan and guide holes for the guide pins at respectively predetermined positions in the cassette, so that all of these holes are aligned with the respective components therefor, and also, a recording and playback head, an erasing head and a pinch roller must each be set at predetermined positions relative to the tape driving face of the cassette to effect operation thereof. Various means have been employed for simplifying the operation of inserting the cassette, but most of these methods are not suitable for use in a car and many also suffer from other operational difficulties. Although attempts have been made to overcome these defects, they still have certain disadvantages such as being unstable during operation under vibratory conditions, a situation under which none of these devices heretofore available has had any satisfactory effect.

In general, a tape recorder being designed and constructed for use in an automobile must satisfy a number of specific requirements, namely, its method of operation must be simplified so as to permit ready operation thereof while simultaneously driving a car, and it must be of minimal size, since little space is available for accommodating recorders in a car, although such devices are usually installed in the dash board, or thereunder, in front of the driver's seat. Also, the area of the operating board, or frontal surface, of the tape recorder, which is normally exposed to the driver's seat or cab, should be minimized for the same space limitation reasons, and the cassette should be appropriately fitted therein so that vibration of the automobile in its normal running condition will have no adverse effects upon the satisfactory performance thereof.

SUMMARY OF THE INVENTION

Accordingly, it is an object of the present invention to provide a cassette type tape recorder which provides for easy insertion and removal of the cassette tape while retaining high stability against vibration.

It is another object of the present invention to provide an improved cassette type tape recorder which can be easily placed in an operative condition by simply inserting the cassette into the player and pushing down a supporting member of the cassette, and which can be released from the operative condition by simply pushing a release button, so that the operation is extremely easy and stable without causing any undesirable change of the fitted condition either in the vertical, lateral or back and forth direction.

Still another object of the present invention is to provide an improved cassette type tape recorder having a cassette inlet opening of extremely small size, and also an exposed operating board face of small proportional area similar to that of a conventional car radio.

BRIEF DESCRIPTION OF THE DRAWINGS

Various other objects, features and additional attendant advantages of the present invention will be more fully appreciated as the same becomes better understood from the following detailed description when considered in connection with the accompanying drawing, wherein like reference numerals designate like or corresponding parts throughout the several figures, and in which.

DESCRIPTION OF A PREFERRED EMBODIMENT

Figure 1:
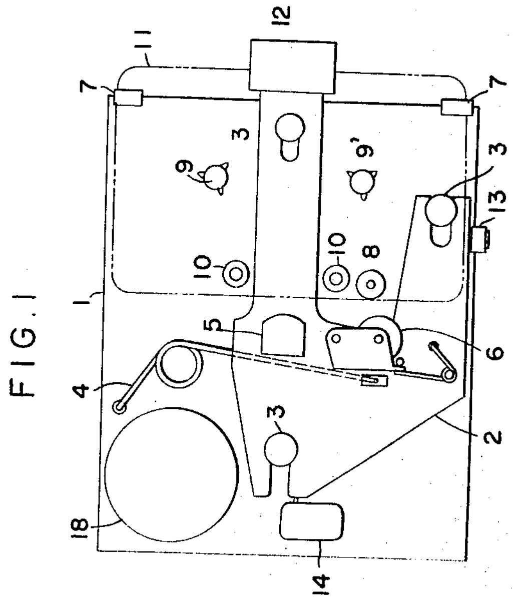
FIG. 1 shows a top plan view of a tape driving member formed according to the present invention.

Referring now to the drawings, and more particularly to FIG. 1 thereof, there is shown a substantially horizontally disposed main base member 1 having a subordinate base member 2 supported in slideable relation therewith along a predetermined axis on a plurality of upstanding struts 3, being shown as three in number, which are received in accommodating elongate slots in the subordinate base member. A spring 4, secured at one end to the main base 1, normally presses against the subordinate base member 2 for urging the same in a right-ward direction, as observed in the drawings, toward a position in which a recording or playback head 5 and a pinch roller 6 disposed in predetermined positions thereon are operatively positioned against a cassette tape when a cassette 11 is placed in an operating condition on a cassette supporting member 7 with a capstan 8, a pair of reel rests 9, 9' and guide pins 10 being respectively received in appropriate holes in the cassette. An electric switch 14 is provided on the main base member 1 in alignment with the path of movement of the subordinate base member 2 so that an electric circuit including an electric motor 18 and other elements is made and broken in accordance with the sliding movement of the subordinate base member 2, and the corresponding engagement or disengagement of one end of the subordinate base member with the switch. As shown in FIG. 1, the switch 14 is engaged by the end of the subordinate base member 2 and accordingly is in a "broken" state.

Figure 2:
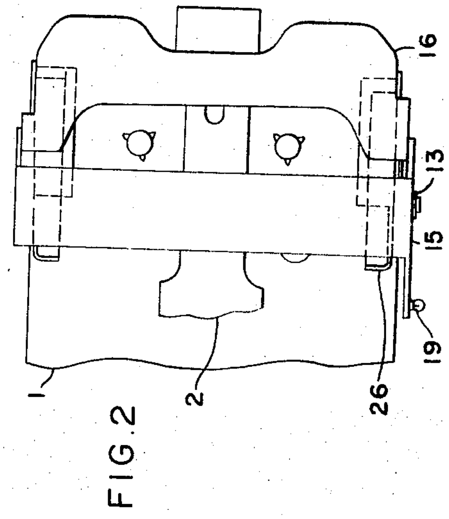
FIG. 2 shows a top plan view of a cassette retaining mechanism shown with a part of the tape driving member of FIG. 1.
Figure 3:
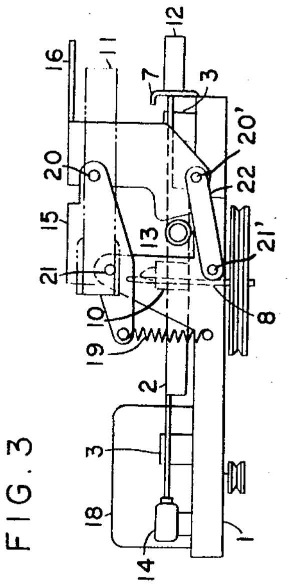
FIGS. 3 and 4 show side views of the cassette retaining mechanism, FIG. 3 showing a condition prior to being placed in operation, and FIG. 4 showing a condition wherein the tape is being transferred for recording or playback purposes.
Figure 5:
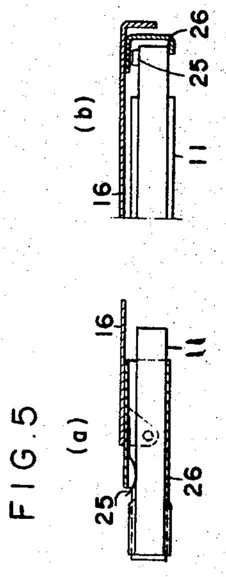
FIGS. 5(*a*) and 5(*b*) are a side view and a rear view, respectively, showing in section the manner in which the cassette is held in the cassette retaining member.

Referring now to FIG. 2, the main base member 1 is provided with cassette retaining means comprising a first bridge element 15, a second bridge element 16 and a cassette receiving member 26, which is adapted to horizontally receive and retain the cassette 11 in a predetermined upper position therein, as shown in FIG. 3. The cassette receiving member 26 and a tension plate 25 are fixedly secured to the second bridge element 16, as shown in FIG. 5, and these members are pivotally connected to the main base member 1 through the first bridge element 15, connecting rods 22 and joint shafts 20, 20', 21, 21', so that the bridge member fulcrums about the shafts 21 and 21' for moving the cassette 11 vertically downwardly, and is also returned by a spring 19 connecting one end of the bridge member 15 with the base member 1 for elevating the cassette 11 to its upper position.

Figure 4:
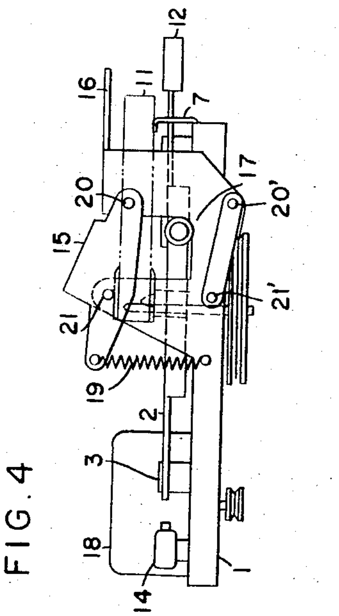

A set roller 13 is rotatably provided on the side surface of the subordinate base member 2 and the upward movement of the subordinate base member 2 is prevented by a cam surface 17 formed on the second bridge element 16. In the operation of the tape recorder, the cassette 11 is set on the driving means when the cassette is horizontally inserted from the front surface into the cassette holder 26, and the cassette 11 is moved downwardly by arcuately turning the cassette holder 26 about the fulcrums of the shafts 21 and 21', while the cassette is horizontally retained therein so that the capstan 8, reel rests 9, 9' and guide pins 10 are respectively inserted in appropriate holes of the cassette, as hereinbefore indicated. Then, the subordinate base member 2, which is retained on the cam surface 17 and by the roller 13, is in the condition of driving the tape as shown in FIG. 4, through the action of the spring 4 urging the same toward the right. Simultaneously, the electric switch 14 is actuated to initiate driving of the tape as it is released by the movable subordinate base member 2. In this condition, the cassette 11 is retained by the guide pins 10 and the cassette supporter 7 and is fixed in the predetermined position by the pressure spring 25 on the bridge member 16.

In the operation of removing the cassette, a release button 12 is pushed down to move the subordinate base member 2 backwardly, or to the left, so as to remove the head 5 and the pinch roller 6 from the tape surface. Then, the second bridge member 16, retained in the driving position with the roller 13, is raised and returned to the original position, as shown in FIG. 3, by action of the spring 19. All of the operations are stopped so as to easily remove the cassette 11, but cutting the electric switch 14.

As stated above, the tape recorder according to the present invention has the advantages of being placed in an operating condition by simply inserting the cassette and pushing down the second bridge member 16, and also for being returned to a standstill condition by simply pushing down the release button 12. Moreover, stable operation is provided, without any change in the condition setting of the cassette being effected by external vibrations in any direction i.e. vertical, lateral, or a back and forth direction. Furthermore, the area of the inlet port for the cassette can be minimized and the area of operating board surface in a car can also be minimized substantially in the same manner as that of a conventional car radio.

Obviously, many modifications and variations of the present invention are possible in light of the above teachings. It is to be understood, therefore, that within the scope of the appended claims, the present invention may be practiced otherwise than as specifically described herein.

What is claimed as new and desired to be secured by letters patent of the united state is:

1. A cassette type tape recorder comprising:
- a main base member;
- a subordinate base member slidably disposed on said main base member and having a tape engaging head and a pinch roller positioned thereon;
- a bridge member pivotally connected to said main base member for vertical displacement relative thereto;
- a cassette-retaining member on said bridge member for supporting a cassette in a substantially horizontal position;
- a set roller provided on said subordinate base member; and
- cam means on said bridge member cooperably associated with said set roller during movement of said bridge member vertically downward relative to said main base member for retaining said cassette in an operating position on said subordinate base member and said main base member.

2. A cassette type tape recorder as set forth in claim 1, further comprising an electric switch which is operatively responsive to sliding movement of said subordinate base member.

3. A cassette type tape recorder as set forth in claim 1, wherein said bridge member comprises:
- a first bridge element;
- a second bridge element;
- said first bridge element being pivotally connected at an intermediate portion thereof to said main base member;
- one edge of said first bridge being pivotally connected to said second bridge element retaining said cassette holder; and
- means normally urging the other edge of said first bridge vertically downwardly for causing said one edge and said cassette-retaining member secured thereto to move upwardly to an inoperative position.

4. A cassette type tape recorder as set forth in claim 1, wherein said bridge member consists of a first bridge element and a second bridge element;
- one edge of said second bridge element being pivotally connected to said main base member through a joint shaft and connecting rods and the other edge of said second bridge element being pivotally connected to said first bridge element through a joint shaft; and
- said second bridge element having holding means for horizontally retaining said cassette.

5. A cassette type tape recorder as set forth in claim 4, wherein said holding means comprises a cassette holder provided on a horizontal part of said second bridge element, and a spring normally maintaining said cassette in said horizontal position therein.

6. A cassette type recorder as set forth in claim 4, further comprising a release button fixed on said subordinate base member for releasing said cassette from said operating position and permitting the second bridge member to be moved vertically upward from said subordinate and said main base members.

* * * * *